R. H. CHINN.
Photographic-Pictures.

No. 153,048. Patented July 14, 1874.

Witnesses:
James Martin Jr
J. N. Campbell

Inventor.
Richard H. Chinn
by
Messrs. Fenwick & Lawrence

UNITED STATES PATENT OFFICE.

RICHARD H. CHINN, OF WASHINGTON, DISTRICT OF COLUMBIA, ASSIGNOR TO HIMSELF AND JOHN L. McGEE, OF SAME PLACE.

IMPROVEMENT IN PHOTOGRAPHIC PICTURES.

Specification forming part of Letters Patent No. 153,048, dated July 14, 1874; application filed May 26, 1874.

*To all whom it may concern:*

Be it known that I, RICHARD H. CHINN, of Washington city, District of Columbia, have invented an Improvement in Photographic and Camera Pictures; and I do hereby declare that the following is a full, clear, and exact description of the same, reference being had to the accompanying drawing making part of this specification, in which—

Figure 1:
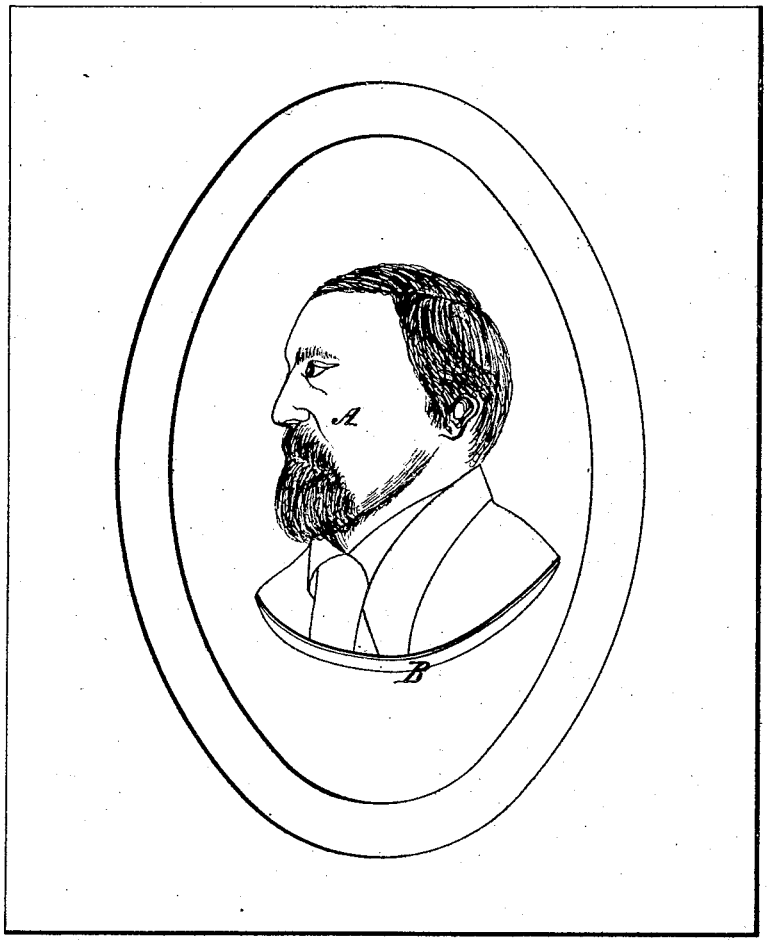
Figure 2:
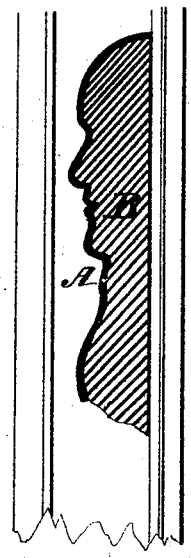

Figure 1 is a front view, and Fig 2. a vertical section, of a picture illustrating my invention.

The nature of my invention consists in forming relief or projecting pictures from photographic and all camera pictures by protruding the image from the surrounding surface or background by applying pressure, and sustaining it in position by applying beeswax, plaster, or other suitable impressible material, or by cutting out the picture from the background and embossing the image by pressure, and adding wax or other substance to give more prominence or ornament to any part desired. Ornaments can be added by attaching them to the relief, such as neck-chains, ribbons, or any raised work as part thereof, such as additional portions of the figure itself adjusted thereto, forming a part of the same; or the surrounding background may be raised work to give additional relief to the picture, or as an ornament, such as raised tables, chairs, houses, fields, woods, and other various objects, as desired. By pressing backward the parts of the picture formed by the shadows or shading and pressing forward the light parts, and by rounding and otherwise shaping the picture in semblance of the object to be represented, a perfect image of the original can be obtained in *alto-rilievo* or *basso-rilievo*, as desired, and this can be finished into a complete statue, if desired, by rounding out and shaping the relief by the addition of wax, plaster, or other suitable material, which may be varnished, bronzed, or galvanized. The light and shaded parts of the picture give accurate lines to be followed in tracing the picture and forming the bosses and reliefs.

The object in constructing pictures into this form and shape is to give a more accurate representation of the person or object to be represented, and, by very little labor and skill, forming bass-reliefs and statues from all photographic and camera likenesses and pictures.

The picture may be taken on a metallic pliable substance, or wax, or parchment, and then be formed into a relief; or the photograph may be attached to similar substances, and then be pressed into relief upon a base of wax, plaster, or other suitable substance, in the form of any object desired; and sheet-wax may be added to these relief or projecting pictures, covering the front surface, producing the effect of a perfect wax picture, plain or colored.

A indicates the photograph, and B the wax base upon which parts of it are depressed or projected.

What I claim as my invention, and desire to secure by Letters Patent, is—

1. The process of producing a photographic picture in relief, consisting of taking or mounting the same upon an impressible or pliable substance or base, and then depressing or projecting certain portions of the picture, substantially as described, and for the purpose above set forth.

2. A photographic picture produced in relief, substantially in the manner and by the process described in the preceding claim.

RICHARD H. CHINN.

Witnesses:
JAMES R. DURHAM,
T. F. MAGUIRE.